(12) United States Patent
Page-Wood

(10) Patent No.: US 10,454,304 B2
(45) Date of Patent: Oct. 22, 2019

(54) INDUCTIVE POWER TRANSFER COIL ASSEMBLY AND SYSTEM

(71) Applicant: Apple Inc., Cupertino, CA (US)

(72) Inventor: Russell Page-Wood, Auckland (NZ)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 15/817,022

(22) Filed: Nov. 17, 2017

(65) Prior Publication Data

US 2018/0145539 A1    May 24, 2018

(30) Foreign Application Priority Data

Nov. 18, 2016  (NZ) ........................................ 726502
Dec. 27, 2016  (CN) ..................... 2016 2 1452768 U

(51) Int. Cl.
*H02J 50/10*        (2016.01)
*H01F 27/02*        (2006.01)
*H01F 38/14*        (2006.01)

(52) U.S. Cl.
CPC .............. *H02J 50/10* (2016.02); *H01F 27/02* (2013.01); *H01F 38/14* (2013.01)

(58) Field of Classification Search
CPC ........... H02J 50/10; H01F 27/02; H01F 38/14
See application file for complete search history.

(56) References Cited

U.S. PATENT DOCUMENTS

| 5,000,178 A | 3/1991 | Griffith |
| 5,469,036 A | 11/1995 | Eto |
| 5,496,036 A | 3/1996 | Chester |
| 6,151,231 A | 11/2000 | Saint-Pierre et al. |
| 6,320,772 B1 | 11/2001 | Doyama et al. |
| 2005/0068019 A1 | 3/2005 | Nakamara et al. |
| 2005/0133497 A1 | 6/2005 | Makoto |
| 2007/0064406 A1 | 3/2007 | Beart |
| 2010/0109604 A1 | 5/2010 | Boys et al. |
| 2010/0259217 A1 | 10/2010 | Baarman et al. |
| 2013/0026850 A1 | 1/2013 | Throngnumchai et al. |
| 2013/0030892 A1 | 1/2013 | Liu et al. |
| 2013/0119773 A1 | 5/2013 | Davis |
| 2014/0091755 A1 | 4/2014 | Walley et al. |
| 2014/0197687 A1 | 7/2014 | Lin |

FOREIGN PATENT DOCUMENTS

| CN | 101461114 | 6/2009 |
| JP | H06277358 | 10/1994 |
| JP | 2846090 B2 | 1/1999 |

(Continued)

OTHER PUBLICATIONS

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

(Continued)

*Primary Examiner* — Robert L Deberadinis

(57) ABSTRACT

An inductive power transfer coil assembly including: a coil contained within a housing; and a mount having a base for attachment to a surface and a cavity dimensioned to receive the housing so as to allow the housing to be positioned along the cavity towards or away from the base at a desired position; and a securing mechanism to secure the housing at a desired position with respect to the mount.

10 Claims, 3 Drawing Sheets

(56) References Cited

FOREIGN PATENT DOCUMENTS

| | | |
|---|---|---|
| JP | 2001044054 | 2/2001 |
| JP | 2002246248 | 8/2002 |
| JP | 2006042519 | 2/2006 |
| JP | 2006128381 | 5/2006 |
| JP | 2007505480 | 3/2007 |
| JP | 2011229360 | 11/2011 |
| JP | 2011229360 A | 11/2011 |
| JP | 2013534040 A | 8/2013 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 200712632 | 11/2007 |
| WO | 2008137996 A1 | 11/2008 |
| WO | 2008140333 | 11/2008 |
| WO | 2009004587 A2 | 4/2009 |
| WO | 2010090539 | 8/2010 |
| WO | 2011016736 | 2/2011 |
| WO | 2011016737 | 2/2011 |
| WO | 2011016737 A1 | 2/2011 |
| WO | 2013036146 A1 | 3/2013 |
| WO | 2013122483 A1 | 8/2013 |
| WO | 2014083015 A1 | 6/2014 |

OTHER PUBLICATIONS

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE2016.2600162, p. 1408.

Boys, John T., et al., "Controlling Inrush Currents in Inductively Coupled Power Systems", 2005 International Power Engineering Conference, Nov. 29, 2005—Dec. 2, 2005, 7, IEEE, Singapore, Singapore.

INDUCTIVE POWER TRANSFER COIL ASSEMBLY AND SYSTEM

This application claims priority to New Zealand patent application No. 726502, filed on Nov. 18, 2016, and to Chinese Utility Model No. 201621452768.3, filed on Dec. 27, 2016, which are hereby incorporated by reference herein in their entireties.

FIELD

This invention relates to a mount for an inductive power transfer coil allowing the coil to be positioned with respect to the mount so as to ensure transmitting and receiving coils of an inductive power transfer system are within a desired range of separation.

BACKGROUND

In a range of applications transmitter and receiver coils of an IPT system must be mounted to different components where the spacing between components cannot be tightly controlled. The physical distance between surfaces to which the transmitter and receiver coils are mounted may vary depending on the customer application, equipment or surfaces.

There is a need for a mount allowing variable height mounting for one or both of the transmitter and receiver coils in order to allow the separation between the coils to be brought within the required IPT working range.

It is an object of the invention to provide such a mount and a system utilizing the mount or to at least provide the public with a useful choice.

SUMMARY

According to one example embodiment there is provided an inductive power transfer coil assembly including:
 a. a coil contained within a housing; and
 b. a mount having a base for attachment to a surface and a cavity dimensioned to receive the housing so as to allow the housing to be positioned along the cavity towards or away from the base at a desired position; and
 c. a securing mechanism to secure the housing at a desired position with respect to the mount.

According to another example embodiment there is provided an inductive power transceiver including such an assembly.

According to a further example embodiment there is provided an inductive power transfer system including such an assembly.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
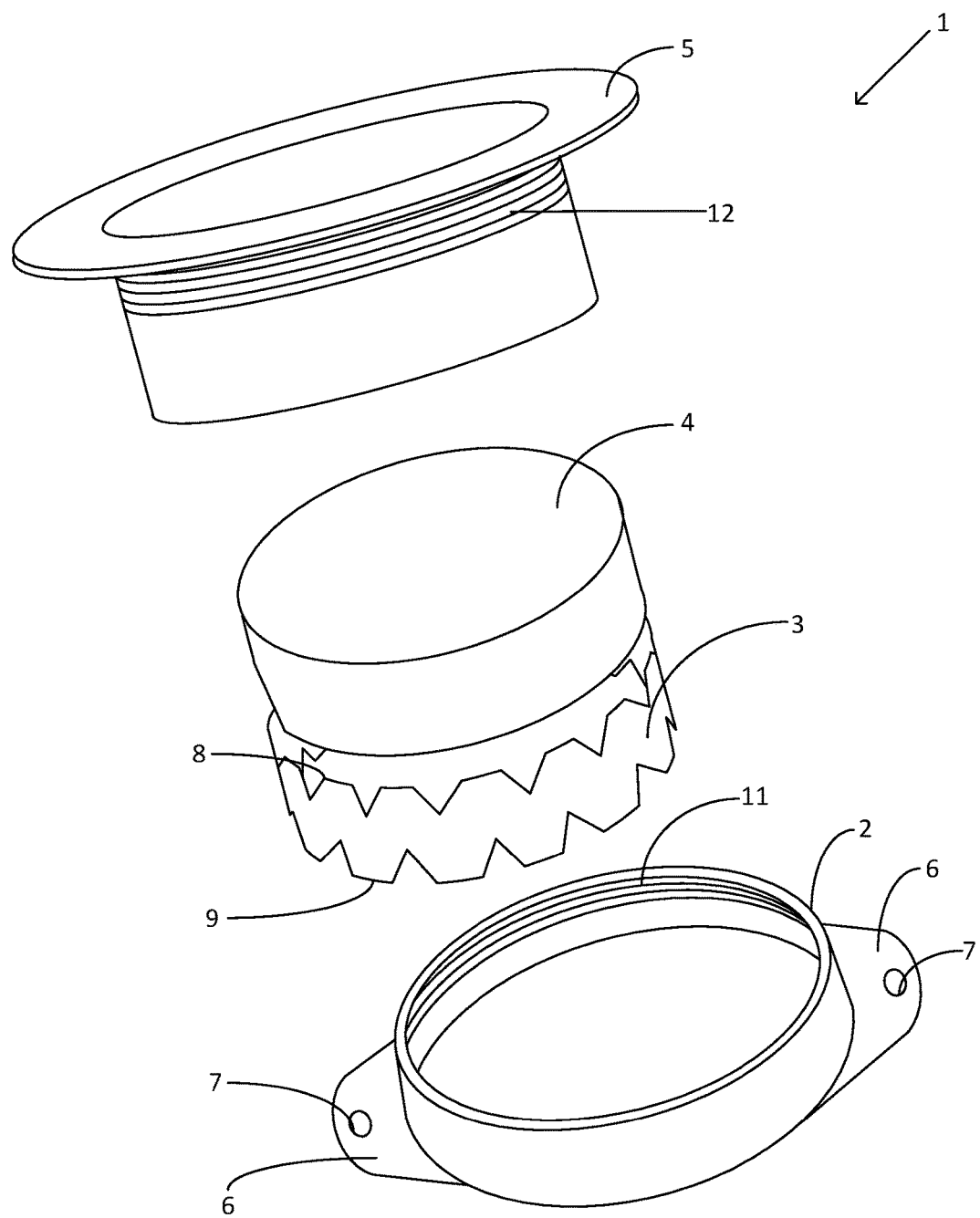
FIG. 1 is an exploded perspective view of an inductive power transfer coil assembly.
Figure 2:
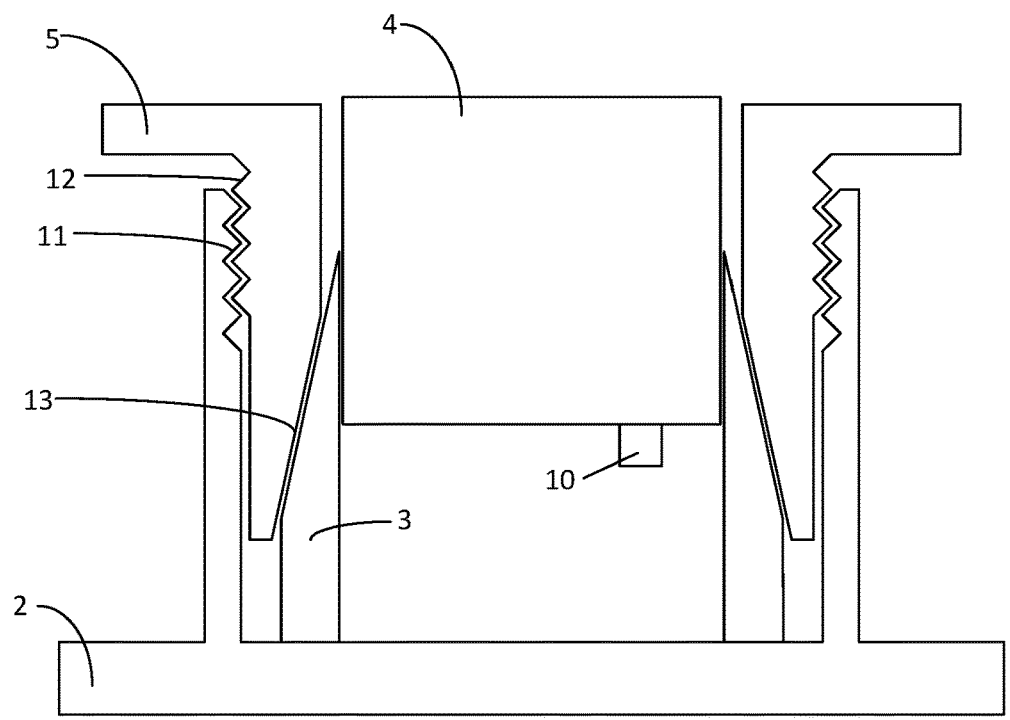
FIG. 2 is a cross-sectional view of the inductive power transfer coil assembly shown in FIG. 1.

FIGS. 1 and 2 show an inductive power transfer coil assembly 1 including a mount 2, resilient sleeve 3, a coil housing 4 and a clamp 5. These elements may all be molded plastics components. The mount 2 has flanges 6 with apertures 7 therein to allow the mount to be secured to a surface by fasteners. Alternatively, apertures could be provided in the base of the mount 2 with the flanges 6 being removed. Resilient sleeve 3 is of annular form with upper castellations 8 and lower castellations 9 provided for ease of deformation of the sleeve.

Housing 4 contains a transmitter or receiver coil with a passageway 10 provided for the passage of wires from the coil. This passageway or an additional passageway may be provided as an air vent and/or for the introduction of potting mix during production to secure the coil and ferrite (and any other) components within the housing.

Mount 2 is provided with an internal thread 11 which mates with external thread 12 of clamp 5. Clamp 5 includes a ramp surface 13 which increasing urges resilient sleeve 3 against housing 4 as clamp 5 is screwed towards the base of mount 2. In this way when clamp 5 is unscrewed and resilient sleeve 3 is not urged against housing 4, housing 4 may be raised and lowered with respect to mount 2. When housing 4 is in a desired relative position to mount 2, clamp 5 may be rotated to force resilient sleeve 3 against housing 4 to secure it in place.

Figure 3:
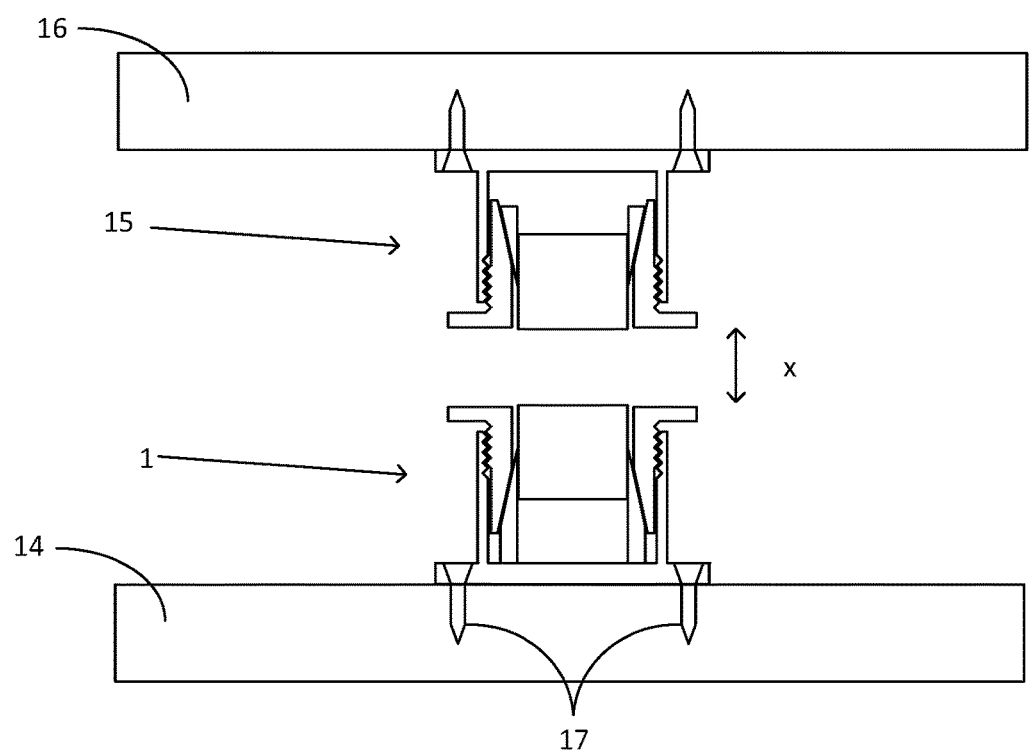
FIG. 3 is a cross-sectional view of a pair of transmitter and receiver coils mounted to opposite surfaces using the inductive power transfer coil assembly shown in FIGS. 1 and 2.
Figure 4:
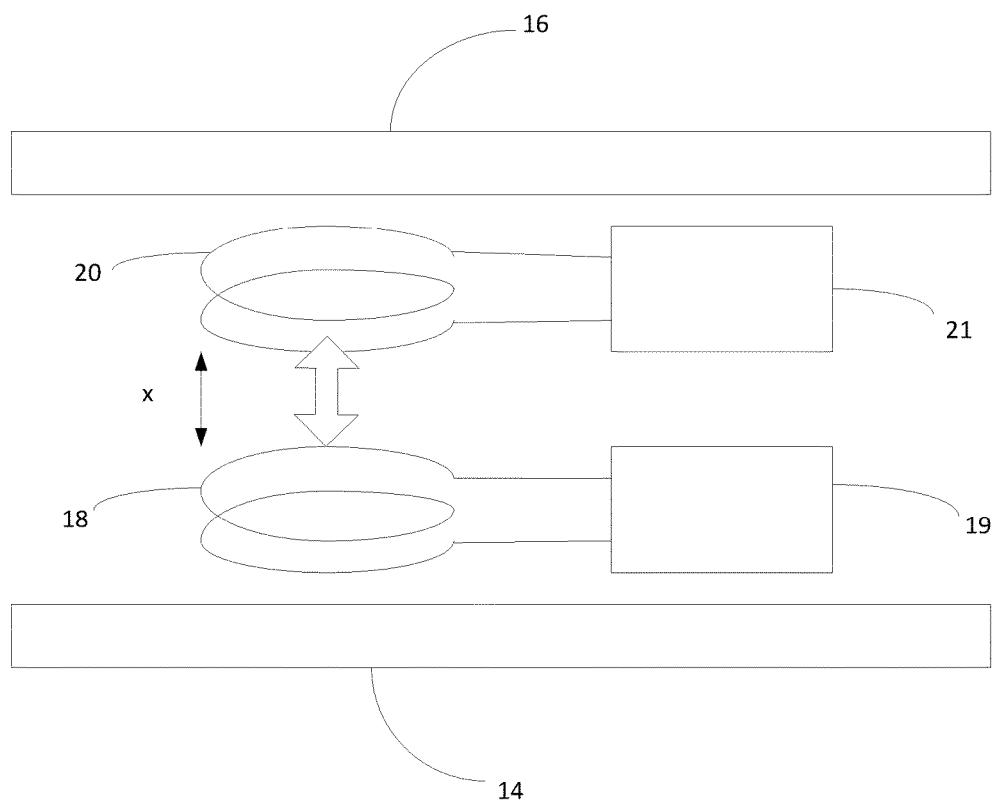
FIG. 4 is a schematic view of an inductive power transfer system implementing the arrangement shown in FIG. 3.

FIG. 3 shows an assembly 1 secured to a first surface 14 by fasteners 17 passing through apertures 7. A similar assembly 15 is mounted to a second surface 16. FIG. 4 shows the transmitter coil 18 that is housed within housing 4, which is driven by inductive power transfer drive circuit 19, and a receiver coil 20, which supplies received power to an inductive power transfer receiver. One or both of coils 18 and 20 may be positioned using the mounting assembly as described above to achieve a desired coil separation x, typically 8-14 mm. Coils may be adjusted to be closer together but may also be moved further away if the separation would be too small for the system design. The distance between the coils 18 and 20 needs to be within a certain range in order for the system to operate optimally. Being too far apart reduces (eventually to zero) power transfer between the coils, and being too close can result in overloading and potentially damage to the circuitry of the transmitter circuit 19 and/or receiver circuit 21.

There are a wide range of situations where such an assembly may be employed. In one example a transmitter may be fixed to a wall using the above assembly. The flanges 6 may either be mounted to the outer surface of the wall lining (surface mount) or the rear surface (to provide a flush mount). An inductive power receiver may be mounted to a tray which is moveable in parallel to the wall with a receiver coil being brought into proximity with the transmitter coil in one position. Where the wall and tray are not within the preferred coil separation range (8-14 mm) of the inductive power transfer system, the desired coil separation may be achieved by positioning one or both coils with respect to its mount in the manner described above.

Many other applications are possible including powering of a replaceable or removable active recycling bin assembly which is powered from a bin holder, a rechargeable robot etc.

The inductive power transfer coil assembly allows the distance between transmitter and receiver coils to be set within a required operating distance with each coil firmly secured in place. It also allows for easy replacement of a coil if required.

While the present invention has been illustrated by the description of the embodiments thereof, and while the embodiments have been described in detail, it is not the intention of the Applicant to restrict or in any way limit the scope of the appended claims to such detail. For example, alternative mounting assemblies could employ a friction fit between the coil housing and the mount or hinged or flexible semi-circular parts which are secured together around the coil housing with a screw. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer coil assembly including:
   a. a coil contained within a housing;
   b. a mount having a base for attachment to a surface and a cavity dimensioned to receive the housing so as to allow the housing to be positioned along the cavity towards or away from the base at a desired position; and
   c. a securing mechanism to secure the housing at a desired position with respect to the mount.

2. An assembly as claimed in claim 1 wherein the securing mechanism includes a resilient sleeve that may be compressed between the mount and the housing to secure the housing relative to the mount.

3. An assembly as claimed in claim 2 including a clamp which has a ramped face adjacent the resilient sleeve to compress the resilient sleeve as the clamp moves towards the base.

4. An assembly as claimed in claim 3 wherein the clamp is of annular form and comprises an external thread to engage with an internal thread in the cavity to allow the distance of the clamp from the base to be adjusted by relative rotation.

5. An assembly as claimed in claim 2 wherein the resilient sleeve is in the form of a ring and includes a plurality of axially extending castellations.

6. An assembly as claimed in claim 5 wherein resilient sleeve has axially extending castellations in both axial directions.

7. An assembly as claimed in claim 1 wherein the mount has a plurality of apertures provided within one or more flanges extending from the mount to allow mounting to a surface.

8. An assembly as claimed in claim 1, wherein the assembly is adapted to secure the coil to within a predetermined working range of a second coil in order to allow inductive power transfer between the coils.

9. An assembly as claimed in claim 1, wherein the coil is coupled to inductive power transfer circuitry in an inductive power transfer transceiver.

10. An assembly as claimed in claim 9, wherein the inductive power transfer assembly is mounted on a surface opposite a corresponding second assembly with a second coil, and wherein the inductive power transfer assembly is adapted to secure its coil to within a predetermined working range of the second coil to allow inductive power transfer between the coils.

* * * * *